United States Patent [19]

Yamashita

[11] Patent Number: 5,283,701

[45] Date of Patent: Feb. 1, 1994

[54] AUTOMATIC RECORDING LEVEL CONTROL SYSTEM PROVIDING FOR MANUAL CHANGE OF THE STANDARD LEVEL

[75] Inventor: Masatsugu Yamashita, Hino, Japan

[73] Assignee: TEAC Corporation, Tokyo, Japan

[21] Appl. No.: 988,783

[22] Filed: Dec. 10, 1992

[30] Foreign Application Priority Data

Dec. 17, 1991 [JP] Japan ................... 3-353244

[51] Int. Cl.$^5$ .................... G11B 5/035; G11B 5/09
[52] U.S. Cl. ............................ 360/65; 360/46
[58] Field of Search ................ 360/65, 66, 67, 68, 360/40, 46; 330/138, 144, 145, 280, 284; 455/232.1, 233.1

[56] References Cited

U.S. PATENT DOCUMENTS

| | | | |
|---|---|---|---|
| 3,604,859 | 9/1971 | Ban | 360/67 |
| 4,258,397 | 3/1981 | Kitamura et al. | 360/68 X |
| 4,344,094 | 8/1982 | Ohtake et al. | 360/66 |
| 4,352,130 | 9/1982 | Hasegawa et al. | 360/66 |

Primary Examiner—John W. Shepperd
Assistant Examiner—Patrick Wamsley
Attorney, Agent, or Firm—Woodcock Washburn Kurtz Mackiewicz & Norris

[57] ABSTRACT

A magnetic cassette recorder is disclosed which has a microprocessor having stored therein a standard recording level. Inputting a signal representative of an actual amount of attenuation being offered by a level control rheostat to the input record signal, and a signal representative of the amplitude of the record signal that has traveled through the rheostat, the microprocessor computes the actual amplitude of the record signal before being attenuated by the rheostat. When the thus computed amplitude of the input record signal exceeds the stored standard amplitude, the microprocessor puts out a control signal for adjusting the rheostat to the standard amplitude. The standard recording level stored in the microprocessor is manually variable by switches to the liking of the particular user.

9 Claims, 3 Drawing Sheets

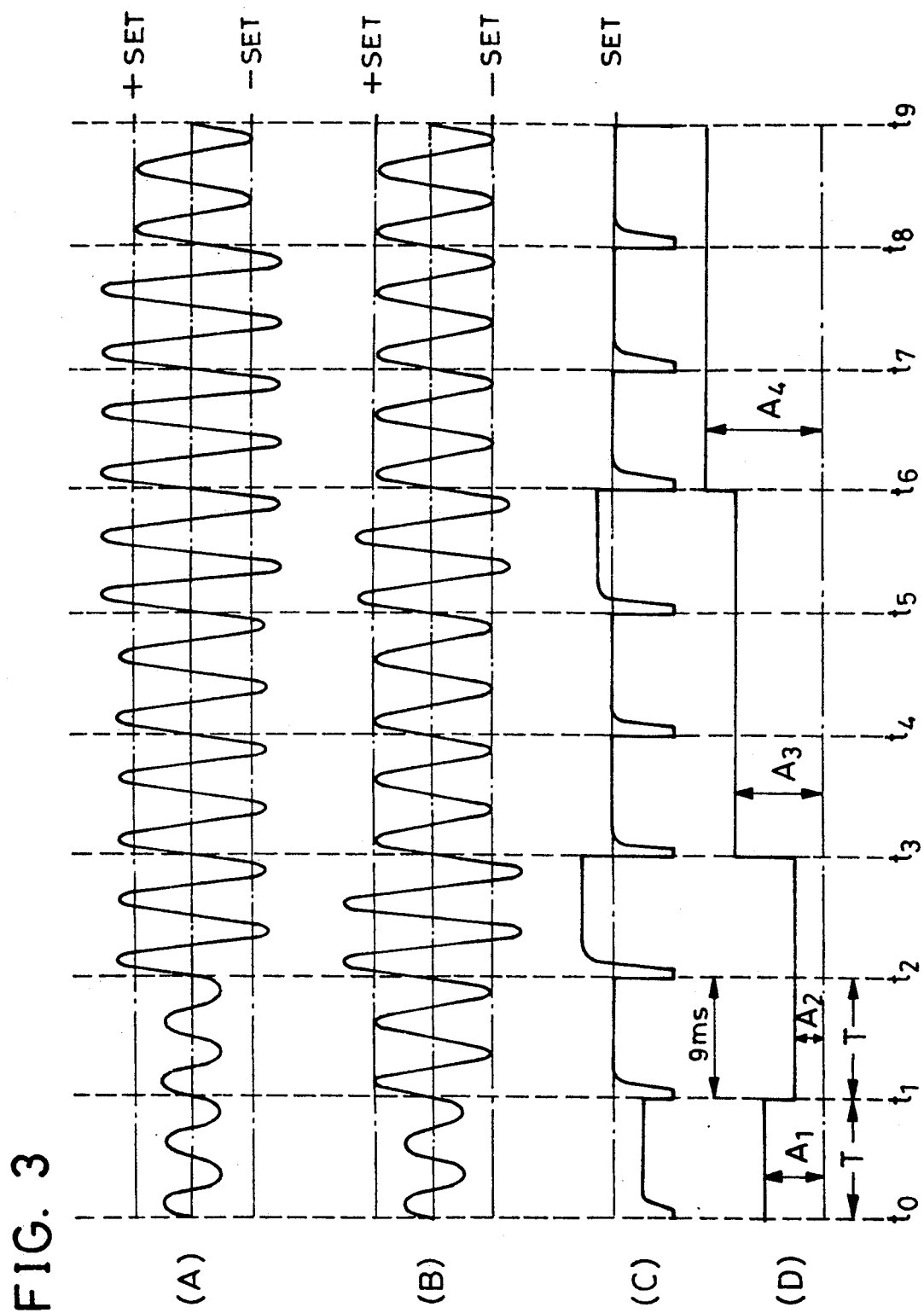

AUTOMATIC RECORDING LEVEL CONTROL SYSTEM PROVIDING FOR MANUAL CHANGE OF THE STANDARD LEVEL

BACKGROUND OF THE INVENTION

This invention relates generally to recording devices such as magnetic tape recorders and, particularly, those for use with tape cassettes. More particularly, the invention pertains to an automatic recording level control system for such recording devices featuring provisions for manual change of the standard level.

In tape recording, as is well known, the recording level or amplifier output level must be adjusted to secure a satisfactory recording, eliminating distortion due to too high a level and a decrease in signal to noise radio due to too low a level. Tape recorders are therefore usually equipped with a level control knob or knobs to be handled manually and a level indicator or indicators which show the voltage level or levels at which a recording is being made. The level control takes the form of a rheostat or adjustable attenuator.

The setting of the recording level by the manipulation of the level control knob can be troublesome to average users. A conventional solution to this problem has been a computer controlled, full automatic level control, as disclosed in Hasegawa et al. U.S. Pat. No. 4,352,130, which makes knob handling totally unnecessary. This seeming advantage of the prior art device, the complete exclusion of the user from the setting of the recording level, is its weakness at the same time. Just as an optimum setting to one user is not necessary so to another, so the setting made by the manufacturer for automatic level control may not be to the liking of the particular user of the recorder.

SUMMARY OF THE INVENTION

The present invention aims at the provision of an automatic recording level control system which combines the advantages of manual and full automatic level controls and which defeats their weaknesses.

Briefly, the invention may be summarized as a recording device comprising a recording circuit which is connected between a record input and a transducer and which includes an adjustable attenuator for reducing the amplitude of an input record signal. An amplitude detector circuit is connected to the adjustable attenuator for detecting the variable amplitude of the record signal that has traveled through the attenuator. Standard level generator means is provided for generating a standard level signal representative of a standard amplitude to which the amplitude of the input record signal is to be limited by the attenuator. Connected to the amplitude detector circuit and the standard level generator means, control means controls the attenuator so as to reduce the amplitude of the input record signal to the standard amplitude when the amplitude of the record signal that has traveled through the attenuator exceeds the standard amplitude. Also included is means connected to the standard level generator means for manually varying the standard amplitude, that is, the standard recording level.

The standard level generator means and the control means can be incorporated in a microcomputer or microprocessor. A memory included in the microcomputer can be used for storing data representative of the standard recording level. The standard recording level may be increased or decreased by switches. In one preferred embodiment, in which the invention is embodied in a magnetic tape cassette recorder, the familiar fast forward switch and rewind switch are used for varying the standard recording level, thereby eliminating the need for provision of any other switches than those conventionally employed with such recorders.

The input record signal will be recorded at the predetermined standard level when the device is set in the automatic recording mode and when the switches are left untouched. The user may increase or decrease the standard level to his or her liking if he or she finds this standard level unsatisfactory. The microcomputer will then automatically adjust the attenuator to the modified recording level.

The above and other features and advantages of this invention and the manner of realizing them will become more apparent, and the invention itself will best be understood, from a study of the following description and appended claims, with reference had to the attached drawings showing a preferred embodiment of the invention.

BRIEF DESCRIPTION OF THE DRAWINGS

FIG. 3, consisting of (A) through (D), is a series of waveform diagrams useful in explaining the recording level control system of FIG. 1.

DESCRIPTION OF THE PREFERRED EMBODIMENT

Figure 1:
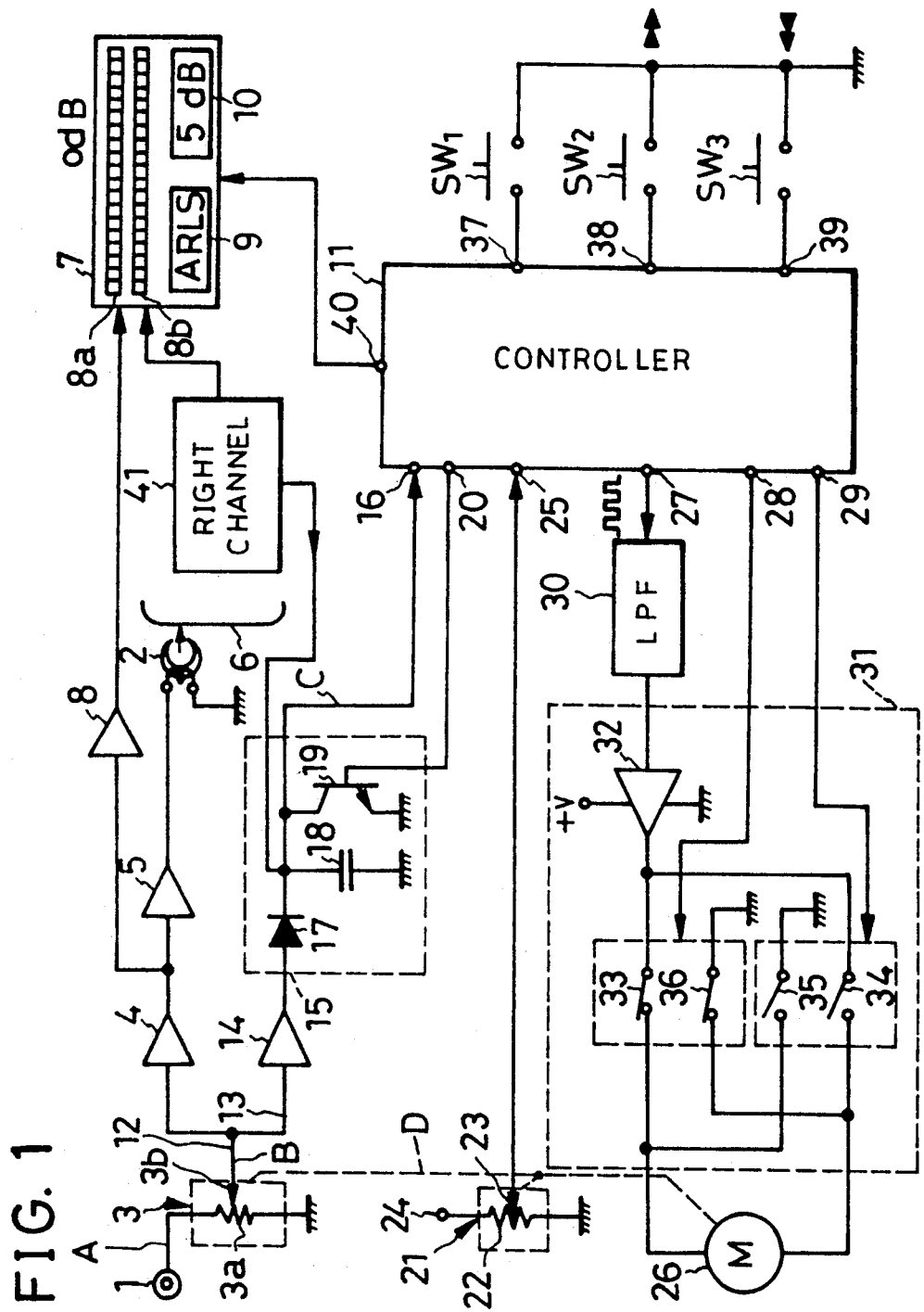
FIG. 1 is a block diagram of a magnetic tape cassette recorder incorporating the automatic recording level control system of this invention.

The invention will now be described in detail as embodied in the magnetic tape cassette recorder diagramed in FIG. 1. The representative recorder has a record signal input terminal 1 for receiving a variable amplitude record signal to be recorded. The input terminal 1 is coupled to a magnetic head 2 via a serial connection of a level control rheostat or attenuator 3, preamplifier 4, and recording amplifier 5 constituting in combination a recording circuit. The magnetic head 2 conventionally records the input record signal on a magnetic tape 6 of a tape cassette as the tape is moved past the head by a tape transport, not shown, of any known or suitable make.

Indicator means 7 are also coupled via a driver amplifier 8 to the output of the preamplifier 4. Made from fluorescent tubes or light emitting diodes, the display means comprise a pair of level indicators 8a and 8b for bar display of the recording levels of both channels of a stereophonic recording, and two other indicators 9 and 10. The illustrated cassette recorder permits either automatic control or manual setting of a recording level. Further, for automatic level control, a predetermined standard amplitude can be manually increased or decreased according to the invention. The indicator 9 will show the capitals ARLS when the recording level is being controlled automatically. When the recording level is set manually, on the other hand, the indicator 9 will show, for example, the count of a tape footage counter. The other indicator 10 will exhibit in decibels the amount by which the standard amplitude has been manually increased or decreased.

The cassette recorder incorporates a controller 11, which in practice may take the form of a microcomputer or microprocessor, for automatic level control. The output line 12 of the noted level control rheostat 3 has a branch line 13 which is connected via an amplifier 14 and an amplitude detector circuit 15 to an input 16 of the controller 11. For detecting the amplitude of the record signal after it has been attenuated by the rheostat 3, the amplitude detector circuit 15 comprises a diode 17, capacitor 18 and a resetting transistor 19. Thus the detector circuit 15 applies to the controller 11 a unidirectional voltage representative of the attenuated record signal amplitude. The resetting transistor 19 becomes periodically conductive for discharging the capacitor 18 in response to resetting pulses supplied from an output 20 of the controller 11, so that the voltage signal produced by the amplitude detector circuit 15 is renewed at intervals determined by the resetting pulses.

The level control resistor 3 can be of known rotary potentiometric or voltage dividing construction. Either way, it comprises a resistor 3a and a slider 3b, the latter being capable of angular displacement in sliding engagement with the former. The resistor 3a is connected between the record signal input 1 and the ground, and the slider 3b to the output line 12, so that the record signal is attenuated to variable degrees depending upon the position of the slider relative to the resistor.

In order to enable the controller 11 to know the level setting on the rheostat 3, there is provided another rheostat 21 which is interlocked with the first rheostat 3. This second rheostat 21 will be hereinafter referred to as the setting detect rheostat in contradistinction from the level control rheostat 3. Similar in cons. "ction to the level control rheostat 3, the setting detect rheostat 21 comprises a resistor 22 and a slider 23. The resistor 22 is connected between a supply terminal 24 and the ground, and the slider 23 to an input 25 of the controller 11. The slider 23 of the setting detect rheostat 21 moves jointly with the slider 3b of the level control rheostat 3, so that a voltage signal indicative of the setting on the level control rheostat 3 can be supplied to the controller 11.

Thus the controller 11 receives through its inputs 16 and 25 the signals representative of the attenuated amplitude of the record signal and of the setting on the level control rheostat 3. The controller refers these input signals to the variable standard amplitude stored therein and controls the level control rheostate 3 to attenuate the incoming record signal to the standard amplitude.

For such automatic actuation of the level control rheostat 3 under the direction of the controller 11 there is provided a bidirectional direct current motor 26 which has its armature shaft coupled to the sliders 3b and 23 of both rheostats 3 and 21. The sliders 3b and 23 are therefore jointly moved relative to the resistors 3a and 22 with the bidirectional rotation of the motor 26.

The controller 11 has a speed control output 27, a forward rotation output 28 and a reverse rotation output 29 for controlling the motor 26. The speed control output 27 supplies pulses having their durations modulated to represent a desired speed of rotation of the motor 26. Connected to the speed control output 27, a low pass filter 30 smooths the duration modulated pulses to produce a direct current speed control signal and delivers it to a driver amplifier 32 included in a motor control circuit 31. The output of the amplifier 32 is connected to the opposite polarity terminals of the motor 26 via a first 33 and a second 34 switch. A third 35 and a fourth 36 switch are connected respectively between the opposite polarity terminals of the motor 26 and the ground. The first 33 and the fourth 36 switch are to be closed by the forward rotation signal from the controller output 28 to cause forward rotation of the motor 26. The second 34 and the third 35 switch are to be closed by the reverse rotation signal from the controller output 29 to cause reverse rotation of the motor 26.

Also connected to the controller 11 are three pushbutton switches $SW_1$, $SW_2$ and $SW_3$. The switch $SW_1$, connected to a controller input 37, is for triggering off the automatic level control operation of the controller 11. This switch $SW_1$ will therefore be hereinafter referred to as the AUTO switch. Connected to controller inputs 38 and 39, respectively, the other two switches $SW_2$ and $SW_3$ are for altering in an increasing and a decreasing direction, respectively, the standard amplitude to which the input record signal is to be limited automatically by the controller 11. The switches $SW_2$ and $SW_3$ will be referred to as the UP and DOWN switches, respectively. All the switches $SW_1$-$SW_3$ are normally open and are grounded, so that the depression of these switches results in the application of binary zero signals to the controller 11.

The controller 11 has another output connected to the indicator means 7. The indicators 9 and 10 make the noted indications under the control of the controller 11.

The showing of FIG. 1 is limited for simplicity only to the left channel recording circuit. It is understood that the illustrated cassette recorder has a right channel recording circuit of like construction, as indicated by a block 41. The right hand recording circuit is shown connected to the amplitude detector circuit 15 since this circuit is common to both channels. Thus, in practice, the attenuated record signals of both channels are superposed one upon the other in the amplitude detector circuit 15 for providing a voltage signal representative of the combined amplitude of the record signals. For the ease of disclosure, however, this cassette recorder will be hereinafter described as if it were monophonic, with only one channel of record signal supplied to the amplitude detector circuit 15.

Figure 2:
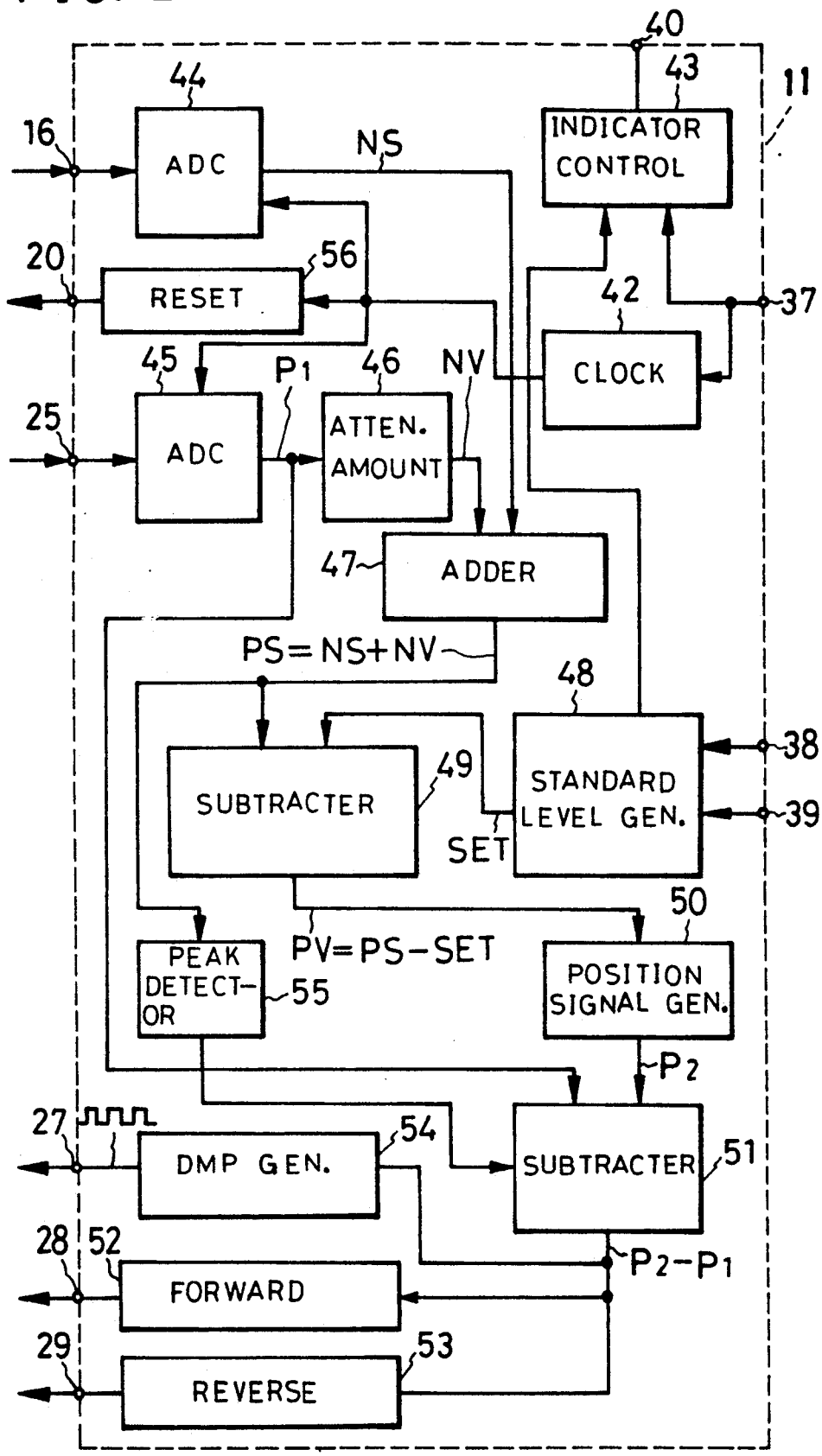
FIG. 2 is a block diagram explanatory of the functions of the controller included in the recording level control system of FIG. 1.

Being typically in the form of a microcomputer, the controller 11 conventionally comprises a central processor unit, random access memory, and read only memory which is programmed for automatic level adjustment in accordance with the invention. Functionally speaking, however, the controller 11 may be thought of as being constructed as diagramed in FIG. 2. The following is a discussion of how the recording level is controlled automatically in the cassette recorder of FIG. 1 under the direction of the controller 11 of FIG. 2. Such discussion will be better understood by referring also to FIG. 3 which shows at (A) through (D) the waveforms appearing at the correspondingly designated parts of the FIG. 1 circuitry.

The AUTO switch $SW_1$ may be depressed for automatic level control, whereupon the sliders 3b and 23 of the rheostats 3 and 21 will be automatically initialized in central positions on the resistors 3a and 22 by means, not shown, of conventional design. A clock 42, FIG. 2, within the controller 11 will start generating pulses upon depression of the AUTO switch $SW_1$. An indicator control circuit 43 within the controller 11 will respond to the depression of the AUTO switch, causing the indicator 9 to display the capitals ARLS.

At (A) in FIG. 3 is shown an example of waveform of the record signal received at the input 1. The record signal will have the waveform shown at (B) in FIG. 3 after traveling through the level control rheostat 3. This waveform will then be directed into the amplitude detector circuit 15. The transistor 19 of the detector circuit 16 has its base connected to a reset circuit 56 within the controller 11, which circuit is connected in turn to the clock 42. The reset circuit 56 comprises a counter for generating a resetting pulse each time it counts the clock pulses for a preassigned time of, say, nine milliseconds. The amplitude detector circuit 15 is therefore reset every nine milliseconds, producing a d.c. signal indicative of the varying amplitude of the record signal that has passed through the level control rheostat 3, as shown at (C) in FIG. 3.

The output from the amplitude detector circuit 15 is directed into an analog to digital converter (ADC) 44 within the controller 11. The ADC 44 will digitize the detector output at sampling intervals determined by the pulses from the clock 42, thereby providing digital data representative of the actual amplitude NS of the record signal on the output line 12 of the level control rheostat 3. The sampling intervals of the ADC 44, as well as of a second ADC 45 within the controller 11, are the same as the spacings or intervals T, FIG. 3, of the noted resetting pulses. Each resetting pulse is generated shortly after the production of one digital sample from the ADCs 44 and 45.

The second ADC 45 will digitize the voltage across the fraction of the setting detect rheostat 21 between slider 23 and supply terminal 24. The output from the second ADC 45 represents, therefore, the actual position $P_1$ of the sliders $3b$ and 23 on the resistors $3a$ and 22 of both rheostats 3 and 21. Receiving this output from the second ADC 45, an attenuation detector circuit 46 will compute the actual amount NV of attenuation offered by the level control rheostat 3 to the record signal on the bases of the second ADC output $P_1$ and of stored data representative of the amount of attenuation per unit change in the position of the slider $3b$. It is understood that such data has been ascertained by measurement and stored on the memory of the controller 11.

An adder circuit 47 has inputs connected to the first ADC 44 and the attenuation detector circuit 46. Thus the adder circuit 47 receives the signal representative of the actual amplitude NS of the record signal that has traveled through the level control rheostat 3, and the signal representative of the actual attenuation amount NV offered by the level control rheostat to the record signal. Adding these input signals together, therefore, the adder circuit 47 will produce a signal indicative of the expected amplitude PS of the record signal as received at the input 1, that is, before being attenuated by the level control rheostat 3.

A standard level generator circuit 48 may, in fact, be a memory on which is stored data representative of a standard amplitude SET to which the amplitude of the input record signal is to be limited by the level control rheostat 3. The standard amplitude SET is variable as aforesaid by the UP and DOWN switches $Sw_2$ and $SW_3$ which also function as fast forward and rewind switches, respectively. One depression of the UP switch $SW_2$ results in an increase in the standard amplitude by one decibel whereas that of the DOWN switch $SW_3$ results in a decrease in the standard amplitude by one decibel.

Having inputs connected to the adder circuit 47 and the standard level generator circuit 48, a subtracter circuit 49 subtracts the standard amplitude SET from the expected amplitude PS of the input record signal. The resulting output from the subtracter circuit 49 represents a required amount PV by which the input record signal amplitude is to be attenuated. A position signal generator circuit 50 responds to this output from the subtracter circuit 49 by generating data representative of a desired position $P_2$ of the slider $3b$ of the level control rheostat 3 corresponding to the required attenuation amount PV. Since the amount of attenuation offered by the level control rheostat 3 per unit change in the position of the slider $3b$ is known as aforesaid, the desired slider position $P_2$ corresponding to the desired attenuation amount PV is obtainable by dividing the desired attenuation amount by the unit attenuation amount.

A second subtracter circuit 51 has inputs connected to the second ADC 45 and the position signal generator circuit 50 for subtracting the actual slider position $P_1$ from the desired slider position $P_2$. The difference between $P_1$ and $P_2$ may be positive or negative.

The output of the second subtracter circuit 51 is connected to a forward signal generator circuit 52 and a reverse signal generator circuit 53. The forward signal generator circuit 52 puts out a signal for closing the switches 33 and 36, FIG. 1, of the motor control circuit 31 when the difference between $P_1$ and $P_2$ is positive, thereby causing the motor 26 to rotate forwardly. When the difference is negative, on the other hand, the reverse signal generator circuit 53 puts out a signal for closing the switches 34 and 35 of the motor control circuit 31 thereby causing the motor 26 to rotate reversely. Thus the motor 26 will rotate so as to zero the difference between $P_1$ and $P_2$, automatically setting the slider $3b$ of the level control rheostat 3 in the desired position $P_2$.

The output of the second subtracter circuit 51 is additionally connected to a duration modulated pulse generator circuit 54 for motor speed control. As has been mentioned, this circuit generates pulses having a duty ratio proportional with the difference between $P_1$ and $P_2$. Consequently, inputting these duration modulated pulses, the LPF 30 produces a direct current speed control signal having a magnitude proportional with the difference between $P_1$ and $P_2$, causing a corresponding change in the speed of the motor 26. The slider $3b$ can thus be moved to the exact position $P_2$ in a minimum of time.

The controller 11 is further shown to include a peak detector circuit 55 connected to the output of the adder circuit 47. The peak detector circuit 55 detects and stores the maximum instantaneous value of the expected record signal amplitude PS, renewing the stored value upon detection of a higher peak. Further the peak detector circuit constantly compares the current expected record signal amplitude PS with the stored peak value and puts out a signal indicative of whether the current expected record signal amplitude is greater or smaller than the stored highest peak value of the past. This signal is impressed to a control input of the subtracter circuit 51, causing the same to perform the calculation, $P_2 - P_1$, whenever a higher peak is detected.

As will be seen by referring to FIG. 3 again, the peak detector circuit 55 has no peak value stored therein at the start of automatic level control at time $t_0$. By time $t_1$, that is, lapse of one sampling interval or one resetting pulse interval T from the time $t_0$, the peak detector circuit 55 will have had detected and stored the peak of the expected record signal amplitude PS during the $t_0-t_1$ time interval, causing the subtracter circuit 51 to perform the computation, $P_2-P_1$. The expected record signal amplitude PS is shown to be less than the standard amplitude SET during the $t_0-t_1$ time interval, so that the slider 3b of the level control rheostat 3 will be driven in a direction for decreasing the amount of attenuation thereby offered to the input record signal. Therefore, as indicated at (D) in FIG. 3, the amount of attenuation will decrease from $A_1$ during the $t_0-t_1$ time interval to $A_2$ during the next sampling interval of $t_1-t_2$.

FIG. 3 shows at (A) that the input record signal is of approximately the same amplitude during the $t_0-t_1$ and $t_1-t_2$ time intervals. However, as the level control rheostat 3 less attenuates the record signal during the $t_1-t_2$ time interval as above, the record signal on its output line 13 will be of greater amplitude during that time interval, as at (B) in FIG. 3. The peak of the thus attenuated record signal will be approximately the same as the standard level SET.

The peak detector circuit 55 will not renew the stored value during the $t_1-t_2$ time interval because then the input record signal at (A) in FIG. 3 is understood to be of the same amplitude as during the $t_0-t_1$ time interval. In this case the substracter circuit 51 will not perform the computation, $P_2-P_1$, so that the level control rheostat 3 will attenuates the record signal by the same amount $A_2$ during the next $t_2-t_3$ time interval as during the $t_1-t_2$ time interval, as at (D) in FIG. 3.

The input record signal is shown at (A) in FIG. 3 to be of greater amplitude during the $t_2-t_3$ time interval. However, since the level control rheostat 3 is set as above to attenuate the record signal by the same amount $A_2$ during this $t_2-t_3$ time interval as during the preceding time interval $t_1-t_2$, the record signal amplitude on the output line 12 of the level control rheostat 3 will naturally be higher, as at (B) in FIG. 3, and so will be the d.c. output from the detector circuit 15, as at (C) in FIG. 3. Inputting the expected record signal amplitude PS from the adder circuit 47, the peak detector circuit 55 will detect and store the higher peak value during the $t_2-t_3$ time interval and trigger the subtracter circuit 51.

Consequently, during the next $t_3-t_4$ time interval, the level control rheostat 3 will attenuate the record signal by a greater amount $A_3$, as at (D) in FIG. 3, suiting the greater amplitude record signal received during the $t_2-t_3$ time interval. The record signal received during the $t_2-t_3$ time interval. The record signal received during the $t_3-t_4$ time interval is shown at (A) in FIG. 3 to be of the same amplitude as during the $t_2-t_3$ time interval. However, since now the level control rheostat 3 attenuates the record signal more than during the $t_2-t_3$ time interval, the record signal amplitude on its output line 12 will not exceed the standard level SET, as at (B) in FIG. 3.

The input record signal is shown to be of greater amplitude during the $t_5-t_6$ time interval than during any previous sampling interval. The peak detector circuit 55 will again detect and hold the higher peak value and trigger the subtracter circuit 51. During the next $t_6-t_7$ time interval, therefore, the level control rheostat 3 will attenuate the incoming record signal to a greater degree $A_4$ than during the $t_5-t_6$ time interval, so that the record signal amplitude on its output line 12 will be limited to the standard amplitude SET.

The input record signal level is shown to be less during the $t_8-t_9$ time interval than during the previous time intervals. The peak detector circuit 55 will not then renew its stored value. The slider 3b of the level control rheostat 3 will then remain unactuated, as at (D) in FIG. 3.

The standard amplitude stored in the controller 11 is variable as aforesaid by the manipulation of the UP switch $SW_2$ and DOWN switch $SW_3$. The indicator control circuit 43, FIG. 2, within the controller 11 will respond to such manipulation of the switches by exhibiting on the indicator 10 how much the standard amplitude has been increased or decreased. Preferably, the level control knob, not shown, coupled to the slider 3b of the level control rheostat 3 may have a light source built into it. The light source may glow intermittently during the progress of automatic level adjustment and continuously upon completion of such adjustment. The user will then be enabled to visually confirm the progress, or completion, of automatic level adjustment.

Automatic level control will be discontinued upon depression of the AUTO switch $SW_1$ for the second time. However, the recording level that has been set during the automatic level control will be maintained even after the depression of the AUTO switch for the second time. The recording level will remain the same either until the AUTO switch is depressed for the third time for recommencement of automatic level control, until the level control knob is manipulated, or until the recorder is powered off.

It is, of course, understood that the foregoing disclosure is by way of illustration only and is not to be taken in any limitative sense. The following is a brief list of examples of possible modifications or alterations of the illustrated embodiment which are all believed to fall within the scope of the present invention as expressed in the appended claims:

1. The two ADCs 44 and 45 shown included in the controller 11 could be external thereto.
2. The various circuits shown included in the controller 11 could be provided individually, instead of incorporating them in a microcomputer.
3. The functions performed by the attenuation detector circuit 46, adder circuit 47, subtracter circuits 49 and 51, etc., could be obtained by time divisional use of a single arithmetic circuit.
4. The rotary rheostats 3 and 21 could by replaced by resistors each having a desired number of taps connected to respective switches which are to be selectively closed by signals from the controller 11.

What is claimed is:
1. A device for recording a record signal on a record medium such as magnetic tape, comprising:
   (a) an input terminal for receiving a variable amplitude record signal;
   (b) a transducer for recording the input record signal on a record medium;
   (c) a recording circuit connected between the input terminal and the transducer, the recording circuit including an adjustable attenuator for reducing the amplitude of the input record signal;
   (d) an amplitude detector circuit connected to the adjustable attenuator for detecting the amplitude of the record signal that has traveled through the attenuator;
   (e) standard level generator means for generating a standard level signal representative of a standard amplitude to which the amplitude of the input record signal is to be limited by the attenuator;

(f) control means connected to the amplitude detector circuit and the standard level generator means for controlling the attenuator so as to reduce the amplitude of the input record signal to the standard amplitude when the amplitude of the record signal that has traveled through the attenuator exceeds the standard amplitude; and (g) means connected to the standard level generator means for manually varying the standard amplitude.

2. A device for recording a record signal on a record medium such as magnetic tape, comprising:

(a) an input terminal for receiving a variable amplitude record signal;

(b) a transducer for recording the input record signal on a record medium;

(c) a recording circuit connected between the input terminal and the transducer, the recording circuit including an adjustable attenuator for offering a variable degree of attenuation to the input record signal in order to reduce the amplitude thereof;

(d) an amplitude detector circuit connected to the adjustable attenuator for detecting an actual amplitude of the record signal that has traveled through the attenuator;

(e) setting detect means for detecting an actual degree of attenuation being offered by the adjustable attenuator to the input record signal;

(f) standard level generator means for generating a standard level signal representative of a standard amplitude to which the amplitude of the input record signal is to be limited by the attenuator;

(g) first arithmetic means connected to the amplitude detector circuit and the setting detect means for providing a signal representative of an expected amplitude of the input record signal before being attenuated by the attenuator, by adding together output signals from the amplitude detector circuit and the setting detect means;

(h) second arithmetic means connected to the standard level generator means and the first arithmetic means for providing a signal representative of a desired amount of attenuation to be offered by the attenuator to the input record signal, by subtracting the standard amplitude from the expected amplitude of the input record signal;

(i) third arithmetic means connected to the setting detect means and the second arithmetic means for producing a control signal necessary for causing the attenuator to offer the desired amount of attenuation to the input record signal;

(j) actuator means connected to the third arithmetic means for actuating the attenuator in response to the control signal so as to cause the attenuator to offer the desired amount of attenuation to the input record signal; and (k) means connected to the standard level generator means for manually varying the standard amplitude.

3. The recording device of claim 1 wherein the adjustable attenuator is a first rotary rheostat, wherein the setting detect means comprises a second rotary rheostat interlocked with the first rotary rheostat, and wherein the actuator means comprises a bidirectional electric motor coupled to the first and the second rotary rheostats.

4. The recording device of claim 3 wherein each of the first and the second rotary rheostats comprises a resistor and a slider movable in sliding engagement therewith, wherein the setting detect means provides an actual position signal representative of an actual position of the slider of the first rotary rheostat relative to the slider, and wherein the third arithmetic means comprises:

(a) position signal generator means for providing a desired position signal representative of a desired position of the slider of the first rheostat corresponding to the desired amount of attenuation; and (b) subtracter means for obtaining a difference between the actual and the desired positions of the slider.

5. The recording device of claim 4 further comprising peak detector means connected to the first arithmetic means for detecting successive higher peaks of the expected amplitude of the input record signal, the subtracter means of the third arithmetic means being connected to the peak detector means for producing a signal representative of the difference between the actual and the desired positions of the slider each time the peak detector means detects a higher peak.

6. A device for recording a record signal on a record medium such as magnetic tape packaged in cassette form, comprising:

(a) an input terminal for receiving a variable amplitude record signal;

(b) a transducer for recording the input record signal on a record medium;

(c) a recording circuit connected between the input terminal and the transducer, the recording circuit including a first rotary rheostat for offering a variable degree of attenuation to the input record signal, the first rheostat comprising a resistor, and a slider movable in sliding engagement with the resistor;

(d) an amplitude detector circuit connected to the first rheostat for detecting an actual amplitude of the record signal that has traveled through the first rheostat;

(e) a second rotary rheostat interlocked with the first rheostat for providing a signal representative of an actual position of the slider of the first rheostat relative to the resistor thereof; attenuation being offered by the first rheostat to the input record signal;

(f) a controller for automatic recording level control, the controller comprising:

(i) standard level generator means for generating a standard level signal representative of a standard amplitude to which the amplitude of the input record signal is to be limited by the first rheostat;

(ii) first arithmetic means connected to the second rheostat for providing a signal representative of an actual amount of attenuation being offered by the first rheostat to the input record signal;

(iii) second arithmetic means connected to the amplitude detector circuit and the first arithmetic means for providing a signal representative of an expected amplitude of the input record signal before being attenuated by the first rheostat, by adding together output signals from the amplitude detector circuit and the first arithmetic means;

(iv) third arithmetic means connected to the standard level generator means and the second arithmetic means for providing a signal representative of a desired amount of attenuation to be offered by the first rheostat to the input record signal, by subtracting the standard amplitude from the expected amplitude of the input record signal;

(v) fourth arithmetic means connected to the third arithmetic means for providing a signal representative of a desired position of the slider of the first rheostat relative to the resistor thereof which position corresponds to the desired amount of attenuation to be offered by the first rheostat; and (vi) fifth arithmetic means connected to the second rheostat and the fourth arithmetic means for producing a control signal necessary for causing the first rheostat to offer the desired amount of attenuation to the input record signal, by ascertaining a difference between the actual and desired positions of the slider of the first rheostat;

(g) actuator means connected to the fifth arithmetic means of the controller for jointly actuating the first and the second rheostats in response to the control signal so as to cause the first rheostat to offer the desired amount of attenuation to the input record signal; and (h) means connected to the standard level generator means of the controller for manually varying the standard amplitude.

7. The recording device of claim 6 wherein the controller further comprises peak detector means connected to the second arithmetic means for detecting successive higher peaks of the expected amplitude of the input record signal, the peak detector means being connected to the fifth arithmetic means for causing the same to produce the control signal representative of the difference between the actual and the desired positions of the slider of the first rheostat each time the peak detector means detects a higher peak.

8. The recording device of claim 6 wherein the standard level generator means of the controller comprises a memory for storing data representative of the variable standard amplitude, and wherein the manually varying means comprises switch means connected to the memory.

9. The recording device of claim 6 further comprising indicator means for visually indicating a deviation from the standard amplitude when the standard amplitude is varied manually, and indicator control means connected between the indicator means and the standard level generator means of the controller for controlling the indicator means.

* * * * *